United States Patent [19]

Herneisen et al.

[11] Patent Number: 4,730,336
[45] Date of Patent: Mar. 8, 1988

[54] OXY-FUEL BURNER SYSTEM

[75] Inventors: Edward L. Herneisen; Robert G. Gist, Jr., both of Gilbertsville, Pa.

[73] Assignee: G & H Oxy-Fuel, Inc., Boyertown, Pa.

[21] Appl. No.: 874,573

[22] Filed: Jun. 16, 1986

[51] Int. Cl.⁴ .............................................. H05B 11/00
[52] U.S. Cl. ......................................................... 373/2
[58] Field of Search ................................... 373/1, 2, 60

[56] References Cited

U.S. PATENT DOCUMENTS

| | | | |
|---|---|---|---|
| 2,927,142 | 3/1960 | LaBate | 373/2 |
| 3,197,539 | 7/1965 | Hinds | 373/2 |
| 3,237,930 | 3/1966 | Hofmann | 373/2 |
| 3,459,867 | 8/1969 | Estes | 373/2 |
| 4,077,614 | 3/1978 | Udo et al. | 373/2 |

FOREIGN PATENT DOCUMENTS

897802  5/1962  United Kingdom .................. 373/2

Primary Examiner—Roy N. Envall, Jr.
Attorney, Agent, or Firm—Pearne, Gordon, McCoy & Granger

[57] ABSTRACT

A method is disclosed for modifying an electric arc furnace to include oxy-fuel burners to assist in the melting of scrap metal by forming an endless melt trench in the scrap metal. Methods of melting scrap metal using an endless melt trench in such a furnace are also disclosed.

23 Claims, 11 Drawing Figures

OXY-FUEL BURNER SYSTEM

BACKGROUND AND SUMMARY OF THE INVENTION

The present invention relates to electric arc furnaces for melting scrap metal, and more particularly to oxy-fuel burner-assisted furnaces. In accordance with the invention, methods of modifying and operating the furnaces are disclosed wherein the burner combustion gases form a circular swirling flow path within the furnace and provide an endless or continuous circular melt trench within the scrap metal.

Electric arc furnaces are used in iron and steel foundries, steel mills, and non-ferrous melt applications. Direct arc furnaces wherein current is passed directly from a power source through the metal are used for their ability to bring the scrap metal or burden material to be melted quickly to pour temperature. Typically, the furnace has a cylindrical side wall which surrounds a central electrode arrangement. The furnace roof and electrode arrangement are removable for charging the furnace through its open top. The furnace is sized to receive its total charge as a plurality of fractional charges deposited in the furnace by an overhead scrap bucket. The fractional charges are sequentially melted. Examples of such furnaces are disclosed in U.S. Pat. Nos. 3,472,649; 4,455,660; and 4,564,950. Herein, a Heroult-type furnace having three centrally located electrodes arranged in a triangular or delta pattern is described in connection with steel-making for purposes of illustration.

Electric arc furnaces are characterized by "cold spots" and uneven melt pattern which are related to the structural features of the furnace and scrap bucket, as well as the scrap material density and/or gross configuration. For example, such cold spots are related to the trefoil-shaped heating pattern of the delta electrode arrangement, as well as other furnace structures such as the slag door and fourth-hole evacuation port locations. Since such structural design features vary, the cold spot locations are not uniform from furnace to furnace. Variations in the positioning of scrap metal charges are also encountered. Furnace diameter, scrap bucket diameter relative to the furnace diameter, and the degree of pivoting of the furnace roof to an open position vary, and tend to result in unique scrap loading patterns for each furnace. Similarly, the composition of the scrap material itself also tends to cause variations in the required heat distribution.

The existence of cold spots and uneven melt patterns may result in energy-inefficient melting of the scrap by the chance distribution of the scrap within the furnace during charging including the possible deposit of excess scrap adjacent a cold spot. Further, the prolonged electrode heat cycle required to melt scrap disposed in a cold spot may in turn impose undue wear damage on exposed side wall portions of the furnace in scrapfree locations, due to the direct exposure to the electrodes. The heat lost from the high temperature gradient across the exposed portions of the side wall adds to the total energy required for the heat.

Oxy-fuel burners which burn a mixture of oxygen and natural gas have been used in electric arc furnaces to assist melting and to heat cold spots located on the basis of furnace and/or electrode positions. For example, in delta electrode patterns the cold spots are located intermediate the adjacent electrodes. In order to heat such cold spots, the prior art discloses the mounting of oxy-fuel burners radially through the furnace side wall to fire directly into the cold spots between adjacent electrodes. Such arrangements have not been found satisfactory in most instances, since they tend to simply divide the cold spot into two smaller and spaced cold spots. The mounting of burners through the furnace roof to fire directly down into the cold spots has also failed to provide satisfactory results.

The use of circumferentially directed oxy-fuel burners mounted through a ring disposed below the furnace roof for impingement of the scrap metal with burner flame jets is disclosed in U.S. Pat. No. 3,459,867. Applicants' own prior art efforts including mounting oxy-fuel burners through the furnace roof in a circumferential pattern similar to that in such patent. In three-electrode furnaces, the roof openings were radially aligned with the electrodes where structurally possible and arranged to fire downwardly at about a 45-degree angle across the cold spot. A cold spot remote from the slag door was assumed to lie on a radial line bisecting the angle between adjacent electrodes and located midway between the electrode outer perimeter and the furnace side wall. The cold spot adjacent a furnace slag door was determined by observation of unmelted scrap to be angularly offset from the radial line intermediate the adjacent electrodes. The operation of these furnaces by applicants did not necessarily result in the formation of a melt trench as provided in the present invention. Applicants did not attempt to provide such melt trench until the discovery of the invention herein.

It has now been discovered that the judicious alignment and heat energy regulation of oxy-fuel burners in an electric arc furnace provide a circular swirling flow of combustion gases which establish an endless melt trench which extends in a circular configuration within the scrap metal about the center of the furnace. Thus, it has been learned that furnace cold spots and/or irregular melt patterns are repeatable or reproducible characteristics of particular furnace installations which can be substantially eliminated and replaced by melt trench operation through individual burner adjustment. The burner firing alignments and energy inputs are adjusted to establish the melt trench based upon observing or monitoring the furnace operation over a period of time to determine furnace cold spots and melt patterns.

In accordance with the invention, different types of burner adjustments are made in particular sequences to assure the provision of the melt trench. The melt trench tends to minimize the inefficient use of electrodes to melt scrap at the perimeter of the furnace and also avoids the excessive wear and damage to the side walls associated with unnecessary direct exposure to electrode radiation.

The melt trench may be used further to optimize the furnace operation, including the provision of energy efficiency improvements and regulation of overall desired characteristics, such as steel demand rates in a particular shop and the relative costs of energy. To that end, the furnace operation is further observed and burner as well as certain electrode operating adjustments are made in order to provide an even or uniform melt characterized by substantially simultaneous completion of scrap melting by the electrode and by the burners. Preferably, the electrodes complete melting of the scrap generally located at the center of the furnace at about the same time the burners complete the melting of radially outward scrap located at the side wall of the furnace.

In accordance with the invention, an electric arc furnace is modified for gas burner assistance by the use of oxy-fuel burners of specific heating and combustion gas velocity characteristics to provide a melt trench. The burners are mounted through the roof to flow combustion gases across associated cold spots, establish circumferential flow of the combustion gases within the furnace, and affect as large an amount of scrap metal with as much energy as possible early in the melt cycle.

A plurality of burners are typically used, one being associated with each cold spot. As permitted by the furnace structure, burners are mounted through the furnace roof at angularly spaced locations upstream from associated cold spots. The burners are swivel-mounted to allow movement through a cone angle of less than about 5 degrees. Such a mounting has been found sufficient to accommodate deviations in mounting point due to furnace structure interference and to enable burner alignment adjustments for effecting the melt trench, even melt operation, and customary optimization variations.

The provision of the melt trench includes initial adjustment of the gross burner energy output, lateral burner firing direction or angle alignment with respect to the center of the furnace, and elevational burner firing direction or angle alignment with respect to the vertical. These adjustments are made in accordance with visual furnace inspections and sensed operating conditions to provide an endless melt trench within the scrap metal and to eliminate side wall wear spots as well as unmelted scrap locations.

The melt trench is a toroidal or donut-shaped melt zone within the scrap metal adjacent the upper surface thereof, and generally extending around the electrodes halfway between them and the furnace side wall. Depending upon the scrap height within the furnace, the trench may include initial tunnel portions extending through the scrap metal which subsequently collapse to provide an open trench corresponding in shape with a toroid sectioned at its mid-plane. It is believed that the melt trench provides a site of rapid and efficient melting, since the swirling combustion gases traveling along the trench more effectively contact the scrap metal at the trench wall over a prolonged period of time. Red steel is observed along the trench bottom as the melting progresses and molten metal continuously drains downwardly from the trench to the furnace bottom. As the trench melts downwardly through the height of the scrap metal pile, scrap metal falls into the trench from the sides thereof and scrap is cleared from the furnace side wall.

As indicated above, the efficiency of the furnace operation and/or special optimized operating characteristics may be achieved by the use of the melt trench. For example, electrical energy consumption has been reduced by as much as 18%. Also, production rates have been increased by reduction of the tap-to-tap time. Efficiency may be increased by even melt, which is effected by delaying the burner firing until sufficient electrode penetration and melting have occurred. In particular contrast with less effective prior art techniques, the burners are ignited prior to the electrode firing in the above-noted U.S. Pat. No. 3,459,867. Once an appropriate burner firing delay has been determined, the energy input of individual burners is adjusted to substantially eliminate disjuncted accumulations of unmelted scrap metal within the furnace.

DETAILED DESCRIPTION OF THE DRAWINGS

Figure 1:
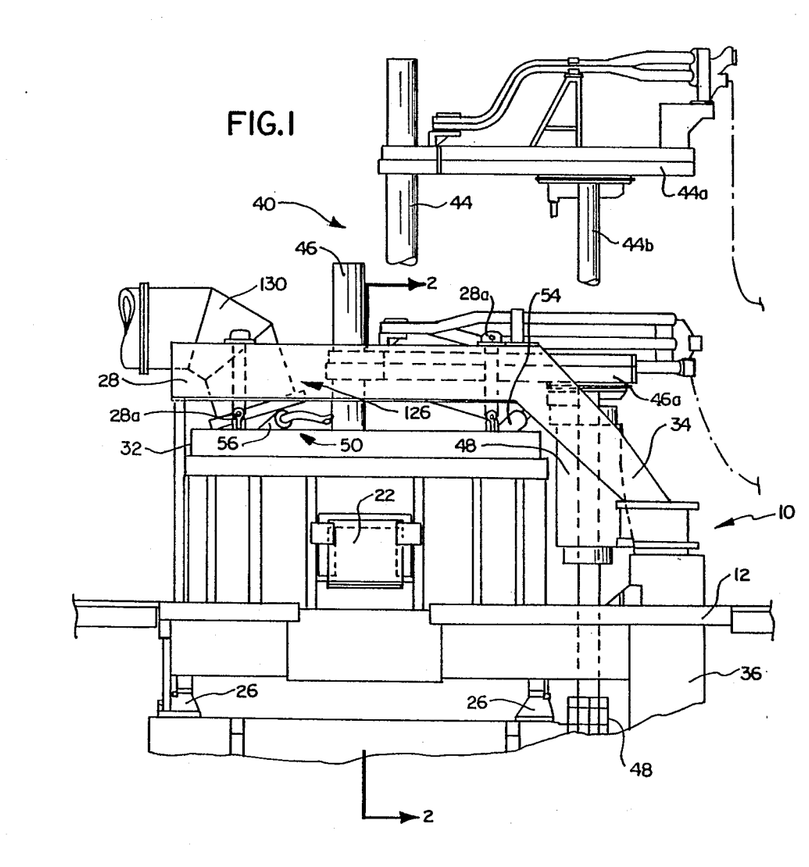
FIG. 1 is a schematic, front elevational view of an electric arc furnace including burners in accordance with the present invention.
Figure 2:
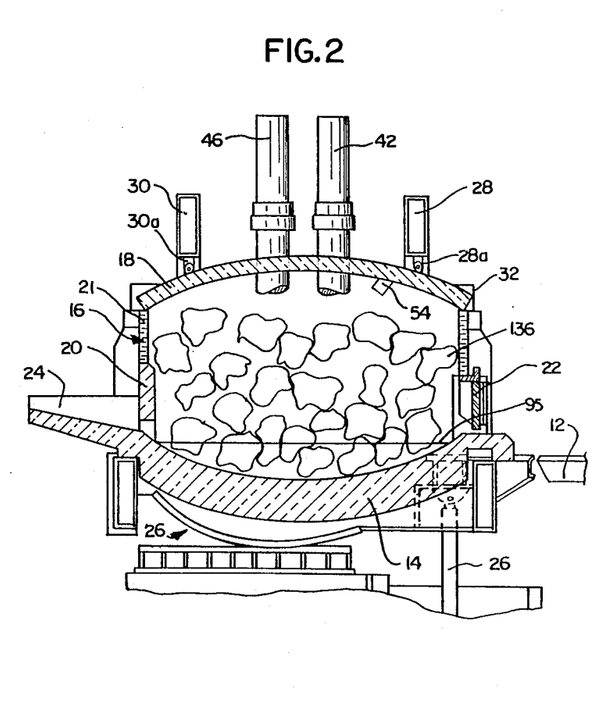
FIG. 2 is a fragmentary, sectional view, taken along the line 2—2 in FIG. 1.

Referring to FIGS. 1 and 2, an electric arc furnace 10 surrounded by a working platform 12 is shown. The furnace includes a concave bottom 14, a cylindrical side wall 16, and a removable roof 18. The bottom 14 and roof 18 are formed of refractory materials and the side wall 16 includes a refractory lining 20 and water-cooled panels 21.

A closable slag door 22 extends through the side wall 16. A tap spout 24 is used to remove molten steel from the furnace. Accordingly, the furnace is carried on a rocker system 26 which includes hydraulic actuators for tilting the furnace and discharging the molten steel through the tap spout 24 in a known manner.

For purposes of charging the furnace, the roof 18 is removed by means of a superstructure which includes roof support arms 28 and 30 connected via lift cables 28a and 30a to a water-cooled roof ring 32. The roof support arms 28 and 30 are connected to a roof mast 34. The roof mast 34, together with the roof 18, is raised and lowered by means of a roof lift system 36 in a known manner. Thus, the roof 18 may be raised and pivoted to a position clear of the furnace 10 in order to allow charging by means of an overhead scrap bucket (not shown).

An electrode assembly 40 is arranged to extend through ports in the roof 18 for purposes of electrically heating and melting the scrap. The electrode assembly 40 includes electrodes 42, 44, and 46. Each of the electrodes is carried by an associated electrode arm 42a, 44a, and 46a, which in turn is supported by an electrode column 42b, 44b, and 46b. Electrode lift means 48 are provided to individually raise and lower each of the electrodes in a conventional manner. Each of the electrodes 42, 44, and 46 is connected to one phase of a suitable three-phase power source. The electrode 44 is shown in a raised position in FIG. 1 for purposes of illustration.

In accordance with the present invention, the furnace 10 has been modified to include a burner system 50 comprising oxy-fuel burners 52, 54, and 56 arranged to circumferentially and tangentially fire into the furnace.

A mixture of oxygen and natural gas in about a 2:1 ratio is combusted in each of these burners. The burners are cooled by circulating water. Fuel and coolant hoses as well as control connections extend from the rearward end of each burner as shown in FIG. 1 with respect to the burner 56. The burners are commercially available in sizes ranging from 20,000,000 to 60,000,000 BTU/hr. The burners are characterized as high velocity precombustion burners and combustion gas velocities have been measured in excess of 3000 feet per second, with the burner operating at a level of 40,000,000 BTU/hr. The burners' combustion gases may have a well-defined flame configuration of 10 to 15 feet long. The burners are provided with controls to regulate their firing rate and they have a high turndown ratio in the range of 1,000–5,000 to 1 which allows the maintenance of a 200,000 BTU/hr. pilot flame to minimize fouling during non-fire (i.e., not high fire) periods. Suitable burners are sold by G & H Oxy-Fuel, Inc., of Filbertsville, Pa.

Figures 3, 4:
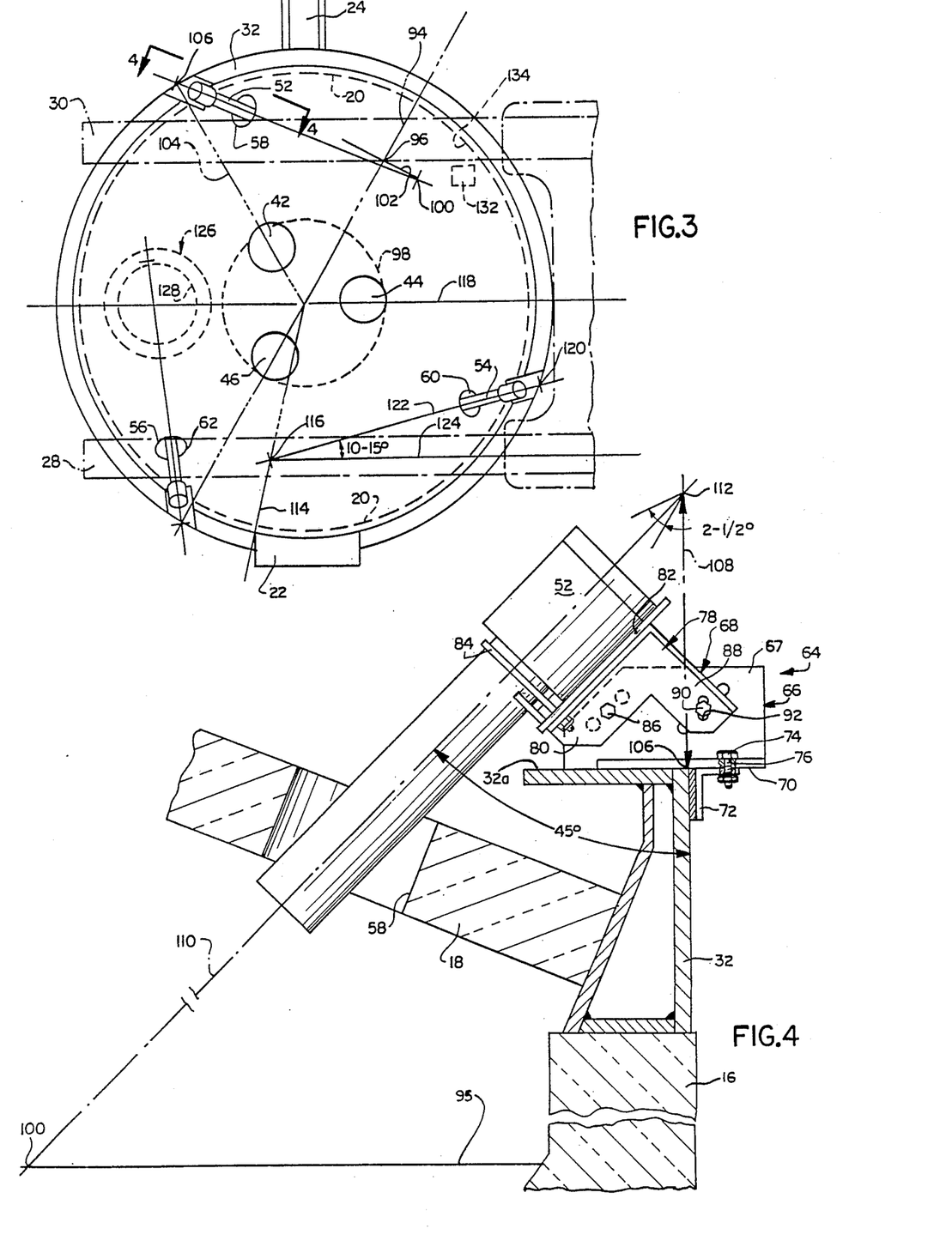
FIG. 3 is a diagrammatic plan view of the furnace, showing the burner mounting and alignment.
FIG. 4 is a diagrammatic elevational view taken along the line 4—4 of FIG. 3, with parts broken away and shown in elevation for clarity of illustration.

The general arrangement of the burner system 50 and its mounting to the furnace are more clearly shown in FIGS. 3 and 4. As indicated above, the burners are arranged to fire downwardly at about a 45-degree angle to flow combustion gases across furnace cold spots. To that end, the burners 52, 54, and 56 are mounted to the roof ring 42 at angularly spaced positions and respectively extend through roof burner openings 58, 60, 62, with sufficient clearance to allow adjustment of their firing directions.

Each of the burners 52, 54, and 56 is secured to the roof ring 32 at its particular angular location by a burner mount 64. The mount 64 includes an inverted T-shaped base member 66 and upwardly projecting central web 67 supporting a burner saddle 68 to which the burner is fixed. The base member 66 also includes a lower horizontal flange 70 supported on an upper rim surface 32a of the roof ring 32 and fixed against radial inward movement by an L-shaped brace 72 which is secured to the roof ring 32 by any convenient means such as welding.

The base member 66 is adjustably secured to the brace 72 by a bolt 74 extending through a slotted opening 76 in the flange 70. An identical bolt 74 and slot 76 (not shown) are located on the other side of web 67. Each of the openings 76 is about 3 to 4 inches long and has an arcuate configuration extending about the furnace diameter to permit lateral or circumferential adjustment of the alignment of the burner.

The saddle 68 comprises a pair of L-shaped members 78 (only one of which is shown) which embraces the upright web 67 of the base member 66. The interior legs 80 of the members 78 are welded to a saddle plate 82 to which the burner is removably secured by a U-bolt 84. The interior legs 80 are also secured to one another by a bolt 86 which passes through a clearance bore in the web 67. The L-shaped members 78 also include exterior legs 88 which are secured to one another by a bolt 90 which extends through slotted openings 92 in the legs 88 and a clearance bore in the web 67. The slotted openings 92 have a vertical dimension of about 2 inches to permit the saddle 68 to be pivoted about the bolt 86 in order to adjust the vertical or elevational alignment of the burner 52.

The lateral and vertical adjustments of the burner mount 64 provide a swivel mounting of the burner 52. For convenience herein, this swivel mounting is assumed to occur about the intersection of the longitudinal axis of the burner with the projection of the furnace side wall and to provide an effective cone angle of 2½°. The cone angle is exaggerated in FIG. 4 for purposes of illustration.

Referring to FIG. 3, the alignment of the burner system 50 is described in greater detail. The burners 52 and 56 are aligned in a like manner, since they are each clear of interfering structure herein and primarily affect cold spots remote from the slag door 22. Accordingly, only the alignment of the burner 52 is described in detail. The alignment of the burner 54 is subsequently described, since it must be mounted in an alternative location due to interfering structure and it primarily affects a cold spot which is shifted from its expected geometric location due to the presence of the slag door 22.

For convenience, each burner is aligned along a firing line extending between a work point and a firing point, as defined hereinafter, which line corresponds with the burner firing direction and longitudinal axis. First, it is observed that a cold spot will typically lie along a radial line bisecting the angle between adjacent electrodes. Assuming a clockwise flow of combustion gases within the furnace as shown in FIG. 3, the cold spot associated with the burner 52 will lie along a radial line 94 which bisects the angle between the electrodes 42 and 44. The firing point is assumed to lie within a horizontal plane passing through hearth line 95 and its determination is described with respect to dimensions within such hearth plane or projections onto the plane. A midpoint 96 as measured along radius line 94 is determined between an outer electrode radius indicated by the line 98 and the side wall refractory lining 20. A firing point 100 associated with the burner 52 is found by measuring a distance of 18 inches along a line 102 which is perpendicular to the radius line 94 and passes through the midpoint 96.

The work point is determined by a radial line 104 bisecting the electrode 42 associated with the burner 52. The intersection of the radial line 104 with the outside perimeter of the roof ring 32 is indicated at 106. A work point line 108 is provided by a vertical line passing through the point 106. A firing line 110 passing through the firing point 100 and extending upwardly at an angle of 45 degrees intersects the work point line 108 at work point 112, as most clearly shown in FIG. 4. As indicated above, the firing line 110 corresponds with the firing direction of the burner 52.

The mounting of the burner 54 is affected by both the proximity of the slag door 22 to the cold spot associated with this burner and the interference of the furnace superstructure located adjacent this portion of the roof ring 32.

The effect of the slag door 22 is to shift the cold spot downstream from its expected location along a radial line extending between the electrodes 44 and 46. To that end, observations have shown the cold spot to lie along a radial line 114 passing through the downstream extremity or vertical edge of the slag door 22. A firing point 116 is located along the line 114 halfway between the outer electrode radius indicated by the line 98 and the side wall refractory lining 20.

The location of the work point for the burner 54 is typically restricted by the superstructure adjacent this portion of the roof. Further, excessive emissions through the slag door 22 result if the work point is located adjacent the intersectcion of a radial line 118 bisecting the electrode 44 and the perimeter of the roof ring 32. Moving in a clockwise direction from the radial line 118, experience has shown that a point 120 may be used to assure heating of the cold spot adjacent the slag door 22 without causing objectionable emissions. The point 120 is typically about 2½ feet from the centerline of the adjacent roof support arm 28, as measured along a line perpendicular to the arm. The location of the point 120 may also be approximated by enclosing an angle of 10 to 15 degrees between the vertical projection of the firing line 122 on the hearth plane and a chord line 124 parallel to the slag door and passing through the point 116. Lastly, a work point for the slag door cold spot may be selected on the basis of available clearance and the intersection of the vertical projection of the point 120 with a firing line 122 passing through the point 116 and extending upwardly at as close to a 45-degree angle as possible.

In furnaces having a single electrode extending downwardly through the roof along the axis of the furnace, the position of the burner primarily affecting the cold spot adjacent the slag door is similar to that described above with respect to the burner 54, except that the firing point is moved radially outward to a location corresponding with about two-thirds of the radius of the furnace. For convenience, the radius containing such firing point may be assumed to also bisect a hypothetical electrode and two additional hypothetical electrodes whch are equally angularly spaced may be assumed to establish work points for two additional burners. In a manner analogous to that described above, cold spots are assumed to lie along the radial lines bisecting the angle between adjacent work points (or hypothetical electrodes) and burner work and firing points are determined in the above-described manner.

In the foregoing manner, the burners 52, 54, and 56 are mounted to the furnace 10 so that the combustion gases emitted by each of the burners flow across the cold spot primarily associated with the burner and establish a circular flow pattern within the furnace. As shown in FIG. 3, the flow pattern of the combustion gases is in a clockwise direction. The initial positioning of the burners as shown in FIG. 3 and described above may be used in the techniques described below to establish melt trench and even melt operations. Experience has shown that determination of the firing points associated with the burners is most important in the burner alignment and practice of the present invention, and that the work points may be varied from the positions indicated in FIG. 3 by as much as nine inches in a horizontal direction along the furnace perimeter. Also, the work point may lie between 15 and 22 inches above the upper rim 32a of the roof ring 32. It should be appreciated that in all cases the burner mounts 64 allow for variable positioning of the burners through a cone angle of 2½ degrees, and that such adjustments may be cooperatively relied upon to compensate for the structural repositioning of any one burner.

The fine tuning or adjustment of the furnace 10 having its burner system 50 aligned as indicated above is described below. The sizing of the burners and the preliminary determination of energy outputs is initially described.

In accordance with the capacity of the furnace, the oxy-fuel burners are selected so that each burner operates in the range of 175,000 to 350,000 BTU/hr. per ton of furnace capacity. Assuming a 200-ton capacity furnace for purposes of example, the burner firing rates may range from 35,000,000 to 70,000,000 BTU/hr. In view of this, an appropriately sized burner may be selected and operated on the high side of the range, at a rate of 45,000,000 BTU/hr.

Experience has demonstrated that efficient burner operation consumes approximately 250,000 to 350,000 BTU per ton of furnace capacity or total charge. Using an intermediate value, the total burner input is 60,000,000 BTU's for the 200-ton capacity furnace. Assuming each of the three burners to operate at the 45,000,000 BTU/hr. firing rate, a total firing time or period of about 27 minutes is calculated. This total firing time and burner heat energy output is distributed by weight or prorated over the fractional charges delivered to the furnace. Assuming three charges of 90, 70, and 40 tons, the burners would be fired for 12, 10, and 5 minutes.

It should be appreciated that the electrical energy input to the furnace is also prorated or distributed over the fractional charges in accordance with the weights thereof. Typical applications range between 400 and 550 kilowatt hours per ton of furnace capacity.

Initially, the burner firing rates are set as high as operating conditions will allow for each charge melting period to achieve quick scrap penetration and efficient heat transfer to as large an amount of scrap as possible. The maximum firing rates are determined by availability of natural gas and oxygen, as well as the capacity of the furnace evacuation system 126. The roof evacuation system 126 includes an evacuation port 128 having an evacuation pipe 130 connected thereto. The evacuation system 126 maintains a vacuum of about one-half inch water column within the furnace in order to suppress gaseous emissions. While the burners are firing, the ambient air pulled into the furnace by the evacuation system 126 is reduced. Therefore, the maximum burning and firing rate may be limited by the ability of the evacuation system to maintain the desired vacuum or negative pressure within the furnace while the burners are firing.

The fine tuning or adjustment of the burner system 50 to provide an endless melt trench is commenced with the furnace-burner configuration and operating conditions as described above. The furnace operation is observed to determine the need for gross operating adjustments to first adjusted operating conditions, as indicated by flame projections at the roof ring 32 or furnace emissions from other joints and openings in the furnace. Flame projections and emissions are eliminated by reduction of one or more of the burner firing rates which can be associated with the particular projection or emission. In order to maintain the desired energy input, the firing times are increased. Similarly, detection of major amounts of unmelted scrap adjacent the burner wall may require increases in the burner firing rates and/or times. A major amount of unmelted scrap metal and the need to adjust the burner heat energy output is indicated by scrap metal positioned close to the side wall, that is, within a distance equal to about 10% of the furnace diameter. Throughout these adjustments, a preference is usually given to higher firing rates and shorter firing times within the firing rate restrictions stated above. These adjustments are made for each of the burners for each of the charge melting periods to determine burner firing rate and times. A microprocessor or other automatic control device may be used to operate the burner system and provide the determined sequence of firing rates and times for each burner for each charge melting period.

The furnace is operated in accordance with the first adjusted operating conditions as determined above for a period of several days or weeks. Visual observations continue during this period to detect patterns of uneven refractory wear and/or unmelted scrap metal. In accordance with these observations, second adjusted burner operating conditions are established by lateral adjustment of the firing direction of the burner primarily affecting the wear or scrap location. Referring to FIG. 3, for example, an observed pattern of unmelted scrap at location 132 indicated in dotted outline would prompt a lateral outward adjustment of the firing direction of the burner 52 by loosening the bolts 74 and pivoting the burner mount 64 in a counterclockwise direction relative to the roof ring 32. On the other hand, a refractory wear point indicated at 134 in FIG. 3 would suggest an opposite lateral adjustment of the burner 52 towards the center of the furnace. Each of the burners 52, 54, and 56 is laterally aligned in accordance with the observed wear and melting patterns.

The observation of furnace operation continues to determine if third adjusted burner operating conditions are required due to persistent side wall wear or unmelted scrap locations. In such cases, the vertical alignment or elevation of the firing direction or angle of the next adjacent upstream burner is adjusted to increase or decrease the energy transferred downstream. For example, the persistence of scrap location 132 would suggest that the firing direction of the burner 56 be increased to a more horizontal position in order to transfer additional heat downstream and to assist in the melting of the scrap metal at location 132. On the other hand, if a wear location 134 has been observed and has persisted, the elevational angle of the burner 56 would be decreased to fire more directly downward into the scrap metal and decrease the amount of heat transferred downstream.

It should be appreciated that minor heat energy output adjustments may be made for particular burners as the second and third adjusted burner operating conditions are established. These energy adjustments may include changes in the burner firing rate and firing time, but they are not as significant as the alignment changes occurring during this procedure.

The continued operation of the furnace in accordance with the third adjusted burner operating condition should provide a melt trench as described more fully hereinafter and be free of side wall wear and/or unmelted scrap metal locations. If such results are not obtained, it is possible that lateral adjustment of the firing direction of the upstream burner is required. The possibility of such an ajustment being necessary increases as the wear or scrap location moves further upstream from the firing point of the primary burner. Thus, fourth adjusted burner operating conditions may be established. Following such adjustments, certain of the foregoing steps may be repeated in the indicated sequence. However, furnace operation characterized by a circular flow of combustion gases and an endless melt trench without side wall wear or unmelted scrap should be obtained without repetition of the procedure.

In accordance with the foregoing procedure, burner firing rates and times are determined for each charge melting period and a single firing direction is determined for each of the burners using a particular sequence of types of burner adjustments.

After adjustment of the furnace in accordance with the procedure to establish a melt trench, typical furnace charges will melt with minimal unmelted scrap on the furnace perimeter. However, this does not necessarily assure an even or uniform melt since the electrodes typically require a greater amount of time to complete the melting of the center scrap as compared with the time required by the burners to complete the melting of the radially outwardly located side wall scrap. Further, the time during the heat at which the melting of the scrap is completed and the amount of time and rate at which the burners are firing need to be adjusted in order to achieve an even meltdown.

The burners will typically complete the melting of the side wall scrap prior to the time the electrodes complete the melting of the center scrap. Accordingly, the electrodes are given a head start by delaying the firing of the burners until the electrodes have initially penetrated to a depth of approximately 20% of the scrap pile with melting. The burner is then fired for the calculated firing time to conclude the melt period, and the electrodes are advanced to their full limit, which may be about 6 inches below the hearth line 95, as they also continue to melt scrap metal. At the conclusion of the firing time, if the furnace side wall is clear of scrap but the electrodes still have a considerable scrap pile to melt, the firing of the burners should be further delayed. On the other hand, if the walls still have scrap, the burner firing should be commenced earlier in the heat. The delay is selected so that the burner firing period corresponding with the remainder of the melt period is just sufficient to complete the melting of nearly all of the side wall scrap except for isolated locations of scrap metal which may be melted by adjustment of individual burner heat energy outputs. Frequently, the furnace operator's expertise must be relied upon to select an appropriate delay.

The delay time is adjusted on the basis of the condition of the furnace as a whole. Accordingly, once the delay time is set, elimination of individual scrap locations may require burner rate and/or time adjustment. A guideline is that increasing the firing time gives the same changes as increasing the firing rate, except that sacrifices are made in melt time and efficiency. Accordingly, if one area of the furnace appears to melt more slowly than another, the first procedure would be to increase the applicable burner's firing rate to just below the point where excessive emissions occur. If the area in question still lags, decreasing the other burners' firing rates slightly while increasing the applicable burner's firing time would be the indicated adjustment. These adjustments are made for a period of several days with continuous furnace observations in order to achieve a consistent, even melt with the formation of the melt trench.

Referring to FIGS. 5 through 9, diagrammatic plan views illustrate the heat influence of the burners and the progressive formation of a melt trench in the furnace 10. For convenience of illustration, the scrap melt charge is not shown in these figures. Reference is made to FIG. 2, where scrap metal charge 136 is shown in elevational view at the beginning of a first melt cycle. As shown, the level of the scrap may approach the top of the side wall 16. (For clarity, the scrap metal distribution is depicted at a low gross density).

Figure 5:
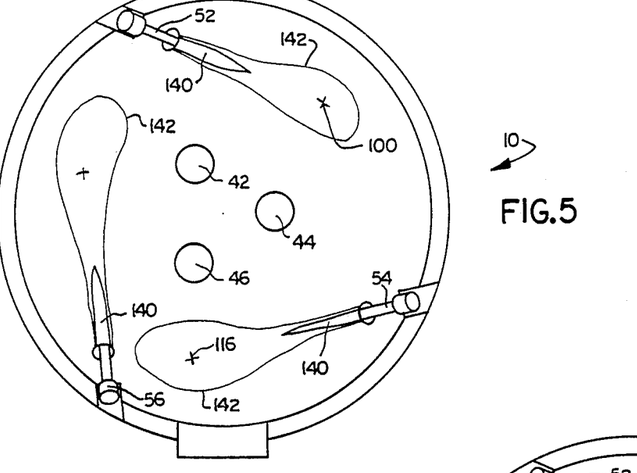
FIGS. 5 through 9 are diagrammatic views showing progressive stages of the penetration and melting of the scrap metal by the burner combustion gases to provide a melt trench.

Referring to FIG. 5, each of the burners is shown having a well-defined combustion gas or flame portion 140 extending along its firing direction or line. FIG. 5 shows the furnace condition after the burners have been firing for about 30 seconds to 2 minutes. At this point in the melt cycle, the combustion gases have bored a short tunnel into the scrap metal charge 136 corresponding in length with the flame portion 140. Within this tunnel, the flame portion is now able to maintain its definition, and it is no longer diffused by the scrap metal charge. Areas of temperature influence are indicated at 142. As shown in FIG. 5, the cold spots and firing points are rapidly heated.

Figures 6, 7:
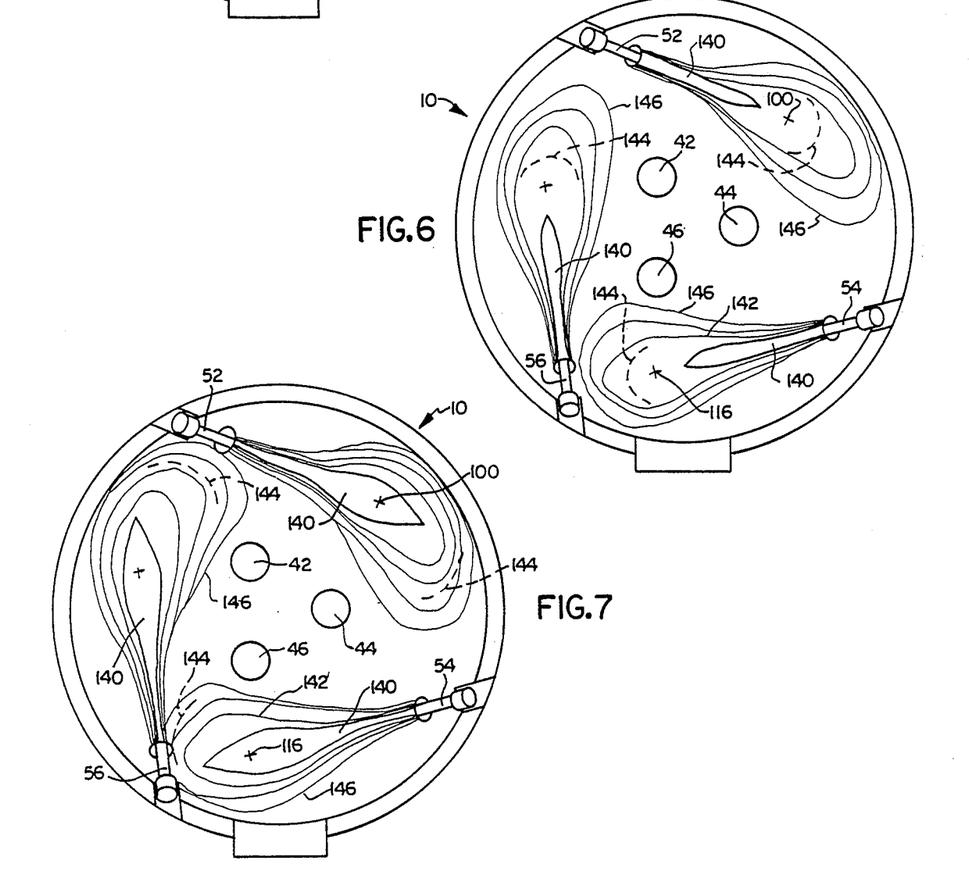

Referring to FIG. 6, the melting has progressed so as to allow the length of the flame portion 140 to increase. The scrap metal collapses into the tunnel to provide a cavity-trench configuration having a leading edge indicated by the dotted line 144. Additional areas of decresing temperature influence are indicated by the lines 146. At about this time in the melt cycle, a circular flow of combustion gases is also established within the furnace.

It should be appreciated that the conditions of melt represented in FIG. 6 may be more rapidly obtained in a subsequent and smaller fractional charge. For example, it is estimated that the conditions of FIG. 6 substantially correspond with those experienced near the beginning of the burner firing cycle in a third charge.

Referring to FIG. 7, it is seen that the length of the flame portions 140 has further increased, with the leading extremities thereof being slightly enlarged despite the absence of impingement upon the scrap metal charge. The melting in the scrap metal assumes a more trenchlike configuration and its arcuate extent is increased as shown by the position of the leading edge 144 of each of the trenches.

Figure 8:
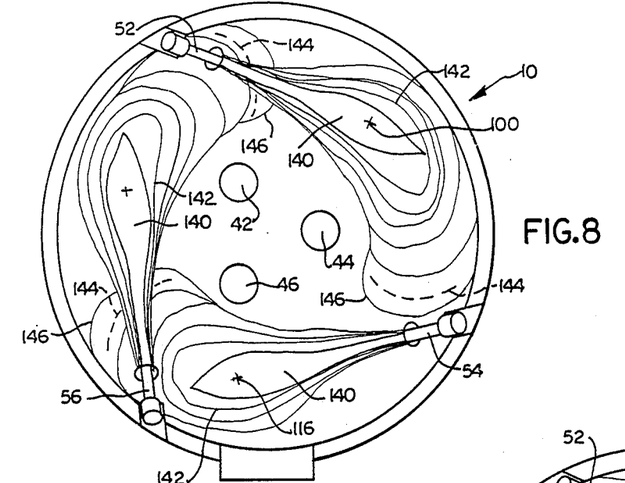

Referring to FIG. 8, the formation of the trench is substantially complete as indicated by the location of the leading edges 144. As shown, the last portion of the trench to be completed is that between the burners 52 and 56. The flame portions 140 have not significantly increased in length, and they are shown at their maximum dimensions.

Figure 9:
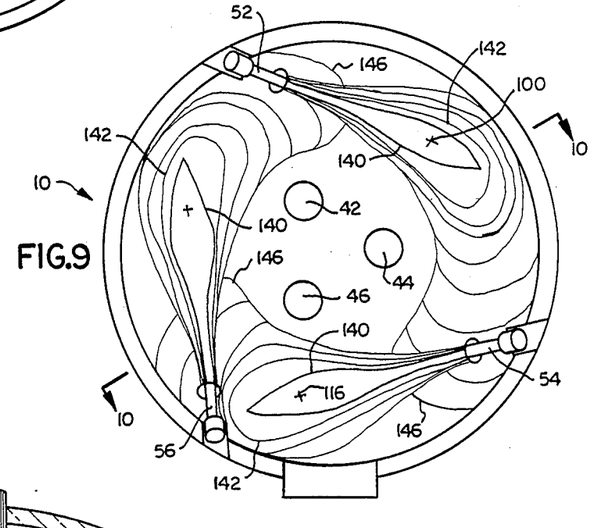

Referring to FIG. 9, the burners 52, 54, and 56 have established substantial overlapping areas of temperature influence, as shown at 146. The trench is now complete in arcuate extent and depth. Red steel may be seen all the way around the furnace within the trench bottom.

Figure 10:
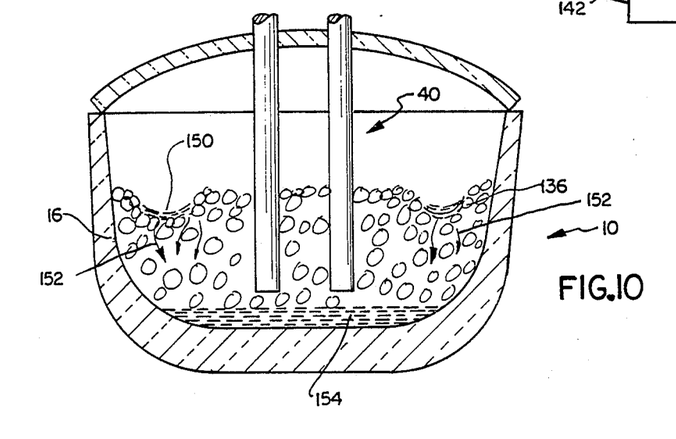
FIG. 10 is a diagrammatic sectional view taken along the line 10—10 in FIG. 9, showing the melt trench formed within the scrap metal.

Referring to FIG. 10, a completed melt trench 150 is shown extending around the electrode assembly. The melting scrap within the bottom of the trench drains downwardly through the remaining scrap metal charge 136, as indicated by the arrows 152, and joins the pool of molten metal 154 forming at the bottom of the furnace. As the trench 150 melts downwardly through the height of the scrap charge 136, additional scrap material falls into the sides thereof, assuring the clearance of scrap from the side wall 16 of the furnace.

Figure 11:
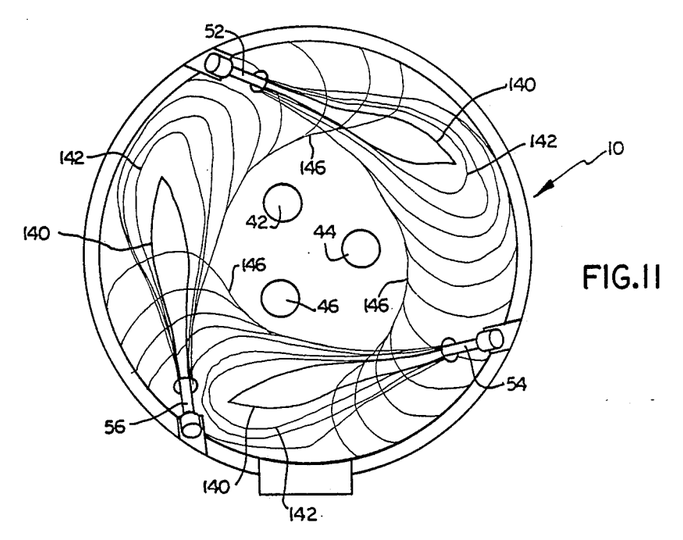
FIG. 11 is a diagrammatic plan view showing the burner heat energy influence within the furnace near the end of the melt cycle.

Referring to FIG. 11, the flow of combustion gases sweeping about the furnace substantially free of contact with scrap metal is diagrammatically shown. At this point near the end of the melt, the areas of decreasing temperature influence substantially combine and demonstrate the magnitude of the heat input provided by the burner system 50 and the evenness of distribution throughout the furnace. Accordingly, during the melt process, the furnace is not as susceptible to an irregular heat requirement at any particular location. That is, the furnace has a capability through the burner system 50, to deliver large quantities of heat to all locations within the furnace.

The ability of the furnace system 50 to deliver significant heat energy to all points within the furnace in combination with the use of a melt trench procedure enables the furnace to be optimized for particular melt shop preferences. For example, energy efficiency is maximized by the use of rapid burner fire rates and minimum firing times. On the other hand, a shop requiring a longer melt cycle may be readily satisfied in accordance with the present invention by reducing the firing rate and increasing the firing time. This will result in some additional energy inefficiency, but it preserves the major efficiencies associated with the melting of side wall scrap by means of the burner combustion gases as opposed to the use of prolonged electrode heating cycles. Upon reduction of the burner firing rates, the burners may be laterally and/or elevationally realigned to more aggressively melt scrap material at the side wall of the furnace. The furnace operation can also be varied to favor the use of gas or electrical heat energy in accordance with relative costs in particular melt applications.

It should be appreciated that the provision of a melt trench, even melt operation, and flexibility to optimize selected aspects of the melting process result from the use of the described oxy-fuel precombustion burners in a technique which allows for individually adjustable burn rates and times based upon observed furnace operation and the automatic sequencing of the burners to effect the desired heat energy inputs. It is convenient to automatically control the firing times and rates through the use of a programmable controller, such as Allen Bradley Model 2/05. The controller may be programmed to sequence the burners through different firing rate and time conditions for each of the fractional charges delivered to the furnace.

The controller may also be arranged to monitor the temperature of cooling water circulated through the roof ring 32, for example, or water-cooled side wall panels 21 in order to detect an unusual scrap loading condition. For example, a location of abnormally high temperature in a side wall panel may indicate a low scrap location requiring a burner adjustment, including reduction of the firing rate or turning the burner "off" to an ignition firing rate. The controller may be used also as a safety device to prevent high firing of the burner unless the roof 18 is properly positioned on the furnace and the evacuation system 126 is operating.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A method of modifying an electric arc furnace to include a plurality of oxy-fuel burners which assist in the melting of scrap metal, said furnace including a bottom wall extending to a generally cylindrical side wall, and centrally located electrode means, comprising the steps of:
   (a) providing a plurality of gas burners operable to emit hot combustion gases for melting scrap metal, each of said burners having a firing rate in the range of from about 175,000 to about 350,000 BTU/hr. per ton of furnace capacity;
   (b) securing mounting means to said furnace to adjustably mount each of said burners to said furnace to flow combustion gases into the furnace along a firing direction extending downwardly at an angle of about 45 degrees and across an associated furnace cold spot, said mounting means being adjustable to laterally vary the firing direction of each of said burners toward and away from the center of said furnace and to vertically vary the firing direction of each of said burners upwardly and downwardly;

(c) selecting a burner firing rate for each of said burners within said firing rate range and operating each of said burners for a firing time of sufficient duration to provide a total heat energy output of from about 250,000 to about 350,000 BTU per ton of furnace capacity;

(d) operating said furnace to determine the occurrence of any side wall wear locations and unmelted scrap metal locations and the burner primarily affecting such location;

(e) adjusting said mounting means to laterally vary the firing direction of said burner primarily affecting the location of side wall wear radially inwardly and to laterally vary the firing direction of said burner primarily affecting the location of any unmelted scrap metal toward such scrap metal;

(f) operating said furnace to determine the continued occurrence of said side wall wear and unmelted scrap locations determined in step (d);

(g) adjusting said mounting means to vertically vary downwardly the firing direction of the next adjacent upstream burner to the location of side wall wear determined in step (f) and to vertically vary upwardly the firing direction of the next adjacent upstream burner to the location of unmelted scrap metal determined in step (f); and thereby mounting said burners to the furnace and aligning their firing directions to provide a circular flow of combustion gases within said furnace and a melt trench within said scrap metal to effect melting of the scrap metal substantially free of side wall wear and unmelted scrap locations.

2. A method as set forth in claim 1, wherein said burners include burner control means to vary the heat energy output of each of said burners and step (c) includes the steps of operating said furnace to determine the occurrence of furnace flame projections, emissions, and major unmelted scrap metal locations, and adjusting the heat energy output of said burners in accordance with observed furnace operation to substantially eliminate any furnace flame projections, emissions, and major unmelted scrap metal locations.

3. A method as set forth in claim 2, including the further steps of:

(h) operating said furnace to determine the continued occurrence of side wall wear and unmelted scrap metal locations determined in step (f); and (i) adjusting said mounting means to laterally vary the firing direction of the next adjacent upstream burner to the location of side wall wear radially inwardly and to laterally vary the firing direction of the next adjacent upstream burner to the location of unmelted scrap metal toward such scrap metal.

4. A method as set forth in claim 2, wherein said furnace receives its total scrap metal charge per heat in a plurality of fractional charges of scrap metal which are each melted during a predetermined charge melting period, and step (c) includes distributing said total heat energy output over said charge melting periods in proportion with the weight of said fractional charges, and further including performing steps (d), (e), (f), and (g) with respect to each of said charge melting periods to determine a single firing direction for each of said burners.

5. A method as set forth in claim 4, wherein steps (e) and (g) each include adjusting said burner control means to vary the heat energy output of said burners.

6. A method as set forth in claim 5, further including determining a heat energy output for each of said burners for each of said charge melting periods.

7. A method as set forth in claim 1, wherein said furnace includes a removable roof and step (b) includes providing roof burner openings and mounting said burners within said openings.

8. A method as set forth in claim 4, wherein step (b) includes determining a plurality of burner firing points and associated work points, and mounting each of said burners to align its firing direction with an associated pair of firing and work points.

9. A method as set forth in claim 4, wherein said furnace includes a slag door extending through said side wall, said electrode means comprise an assembly of three electrodes arranged in a delta pattern, and three burners are provided, and step (b) includes the steps of locating firing points remote from said slag door intermediate adjacent electrodes and locating a firing point adjacent said slag door.

10. A method as set forth in claim 1, wherein said mounting means provide lateral and vertical adjustment of said burner through an effective cone angle of about two and one-half degrees.

11. A method as set forth in claim 1, wherein said furnace includes a roof ring, said mounting means comprise an inverted T-shaped member having an upstanding web and a lower flange secured to said roof ring for pivotal movement relative to the center of said furnace, and a saddle member adjustably secured to said web for pivotal movement in a vertical direction, said burner being secured to said saddle member.

12. A method of modifying an electric arc furnace to include a plurality of oxy-fuel burners which assist in the melting of scrap metal, said furnace including a bottom wall extending to a generally cylindrical side wall, and centrally located electrode means, comprising the steps of:

(a) providing a plurality of gas burners operable to emit hot combustion gases for melting scrap metal, each of said burners having a firing rate in the range of from about 175,000 to about 350,000 BTU/hr. per ton of furnace capacity;

(b) securing mounting means to said furnace to adjustably mount each of said burners to said furnace to flow combustion gases into the furnace along a firing direction extending downwardly at an angle of about 45 degrees and across an associated furnace cold spot, said mounting means being adjustable to laterally vary the firing direction of each of said burners toward and away from the center of said furnace and to vertically vary the firing direction of each of said burners upwardly and downwardly;

(c) selecting a burner firing rate for each of said burners within said firing rate range and operating each of said burners for a firing time of sufficient duration to provide a total heat energy output of from about 250,000 to about 350,000 BTU per ton of furnace capacity;

(d) operating said furnace to determine the occurrence of any side wall wear locations and unmelted scrap metal locations and the burner primarily affecting such location; and (e) adjusting said mounting means to substantially eliminate said side wall wear and unmelted scrap metal locations determined in step (d) by varying the lateral alignment of said firing direction of said burner primarily affecting said location and, if such side wall wear or unmelted scrap location persists upon further operation of the furnace, then varying the vertical alignment of said firing direction of the next adjacent upstream burner, and thereby mounting said burners to said furnace and aligning their firing directions to flow combustion gases into said furnace.

13. A method as set forth in claim 12, wherein said burners include burner control means to vary the heat energy output of each of said burners and step (c) includes the steps of operating said furnace to determine the occurrence of furnace flame projections, emissions, and major unmelted scrap metal locations, and adjusting the heat energy output of said burners in accordance with observed furnace operation to substantially eliminate any furnace flame projections, emissions, and major unmelted scrap metal locations.

14. A method as set forth in claim 12, wherein said melt trench is formed adjacent an upper surface of said scrap metal and extends around said electrode means, said melt trench having a configuration corresponding with a toroid sectioned at its mid-plane.

15. A method of melting scrap metal in a burner-assisted electric arc furnace including centrally located electrode means, a side wall and a plurality of oxy-fuel burners arranged to provide a circular flow of combustion gases within said furnace and a melt trench within scrap metal to be melted, said furnace being of the type that receives its total scrap metal charge per heat in a plurality of fractional charges of scrap metal which are each melted during a predetermined charge melting period, said burners being arranged to operate during each charge melting period at a firing rate and time which provide a total heat energy output of from about 250,000 to about 350,000 BTU per ton of furnace capacity, said electrode means being adapted to melt primarily scrap metal located adjacent the furnace center and said burners being adapted to melt primarily scrap metal located adjacent the furnace side wall, comprising the steps of:

(a) delaying the firing of said burners for a predetermined initial portion of each of said charge melting periods while said electrode means melts a portion of said scrap metal charge;

(b) firing said burners substantially continuously during the remaining portions of said charge melting periods to complete the melting of substantially all of the side wall scrap metal at substantially the end of each of said charge melting periods as said electrode means completes the melting of substantially all of the center scrap metal to thereby provide an even melt.

16. A method as set forth in claim 15, wherein step (a) includes penetrating said scrap metal charge with said electrode means and delaying burner firing until said electrode means penetrates with melting about 20% of the total depth of scrap metal charge within said furnace.

17. A method as set forth in claim 15, including the further steps of:

(c) monitoring the operation of said furnace to detect any side wall wear locations or separate scrap metal locations remaining at the end of said charge melting period; and (d) decreasing the heat energy output of said burner primarily affecting the location and side wall wear and increasing the heat energy output of said burner primarily affecting the location of any remaining scrap metal.

18. A method as set forth in claim 17, wherein step (d) includes decreasing the firing rate and/or time of said burner to decrease its heat energy output and increasing the firing rate and/or time of said burner to increase its heat energy output.

19. A method as set forth in claim 17, wherein step (d) includes decreasing the firing time of said burner to decrease its heat energy output and increasing the firing rate of said burner to increase its heat energy output.

20. A method as set forth in claim 18, wherein said burners are arranged to flow combustion gases in a firing direction extending downwardly at an angle of about 45 degrees and across furnace cold spots, said firing direction being laterally adjustable toward and away from the center of said furnace, and further including the steps of:

(e) laterally varying the firing direction of said burner primarily affecting the location of side wall wear radially inwardly and laterally varying the firing direction of said burner primarily affecting the location of any remaining scrap metal toward such scrap metal.

21. A method as set forth in claim 20, wherein said firing direction is also vertically adjustable in upward and downward directions, and further including the step of:

(f) vertically varying the firing direction of the next adjacent upstream burner to the location of side wall wear in a downward direction and vertically varying the firing direction of the next adjacent upstream burner to the location of remaining scrap metal in an upward direction.

22. A method of melting scrap metal in a burner-assisted electric arc furnace including centrally located electrode means, a side wall and a plurality of oxy-fuel burners arranged to provide a circular flow of combustion gases within said furnace and a melt trench within scrap metal to be melted, said furnace being of the type that receives its total scrap metal charge per heat in a plurality of fractional charges of scrap metal which are each melted during a predetermined charge melting period, said burners being arranged to operate during each charge melting period at a firing rate and time which provide a total heat energy output of from about 250,000 to about 350,000 BTU per ton of furnace capacity, said electrode means being adapted to melt primarily scrap metal located adjacent the furnace center and said burners being adapted to melt primarily scrap metal located adjacent the furnace side wall, comprising performing the following steps in each of said charge periods:

(a) advancing said electrode means with melting through at least a portion of the total depth of said scrap metal charge at the beginning of said charge melting period before firing said burners; and (b) firing said burners substantially continuously during the remainder of said charge melting period as said electrode means moves to its final melt position and also continues to operate to melt scrap metal during the remainder of said charge melting period, said burners and electrode respectively completing the melting of substantially all of said side wall and center scrap metal at substantially the end of said charge melting period to provide an even melt.

23. A method as set forth in claim 22, wherein step (b) includes firing at least one of said burners at a firing rate or time different from another of said burners during at least one of said charge melting periods.

* * * * *